(12) United States Patent
Kang et al.

(10) Patent No.: US 12,521,143 B2
(45) Date of Patent: Jan. 13, 2026

(54) MEDICAL NEEDLE DEVICE

(71) Applicant: L&K BIOMED CO., LTD., Yongin-si (KR)

(72) Inventors: Gook Jin Kang, Seoul (KR); Sang Soo Lee, Anyang-si (KR)

(73) Assignee: L&K BIOMED CO., LTD., Yongin-si (KR)

( * ) Notice: Subject to any disclaimer, the term of this patent is extended or adjusted under 35 U.S.C. 154(b) by 817 days.

(21) Appl. No.: 17/789,910

(22) PCT Filed: Nov. 5, 2020

(86) PCT No.: PCT/KR2020/015387
§ 371 (c)(1),
(2) Date: Jun. 29, 2022

(87) PCT Pub. No.: WO2021/137412
PCT Pub. Date: Jul. 8, 2021

(65) Prior Publication Data
US 2023/0062346 A1 Mar. 2, 2023

(30) Foreign Application Priority Data

Dec. 31, 2019 (KR) .................. 10-2019-0179618

(51) Int. Cl.
*A61B 5/00* (2006.01)
*A61B 10/02* (2006.01)
*A61B 17/34* (2006.01)

(52) U.S. Cl.
CPC ...... *A61B 17/3403* (2013.01); *A61B 10/0233* (2013.01); *A61B 17/3421* (2013.01); *A61B 2017/3409* (2013.01); *A61B 2017/347* (2013.01)

(58) Field of Classification Search
CPC ............ A61B 17/3403; A61B 10/0233; A61B 17/3421; A61B 2017/3409;
(Continued)

(56) References Cited

U.S. PATENT DOCUMENTS 4,266,555 A 5/1981 Jamshidi
5,372,583 A * 12/1994 Roberts ................. A61M 25/06
604/506

(Continued)

FOREIGN PATENT DOCUMENTS

KR 10-2006-0127769 A 12/2006
KR 10-2009-0110983 A 10/2009

OTHER PUBLICATIONS

International Search Report of PCT/KR2020/015387 dated Feb. 9, 2021 [PCT/ISA/210].

*Primary Examiner* — May A Abouelela
(74) *Attorney, Agent, or Firm* — Sughrue Mion, PLLC

(57) ABSTRACT

The present invention relates to a medical needle device, and more specifically, to a medical needle device capable of drilling a fine passage in an affected part of a patient, or collecting a portion of tissue in the body of the patient. Through the present invention, a needle and a handle of the medical needle device may be separated, and thus the device may be conveniently used while not obstructing the view of the affected part when using same. Further, through the present invention, the handle and the needle are unshakably fastened, and thus may be stably used.

13 Claims, 14 Drawing Sheets

(58) Field of Classification Search
CPC .... A61B 2017/347; A61B 2017/00455; A61B 2017/0046; A61B 10/02; A61B 10/04; A61B 17/3472; A61B 2010/045; A61B 2017/3405

See application file for complete search history.

(56) References Cited

U.S. PATENT DOCUMENTS

| | | | | |
|---|---|---|---|---|
| 6,221,029 | B1* | 4/2001 | Mathis | A61B 10/0233 600/564 |
| 6,554,778 | B1 | 4/2003 | Fleming, III | |
| 6,613,054 | B2 | 9/2003 | Scribner et al. | |
| 6,749,576 | B2 | 6/2004 | Bauer | |
| 9,968,373 | B1* | 5/2018 | Greenhalgh | A61B 17/3403 |
| 11,426,249 | B2* | 8/2022 | Miller | A61B 46/10 |
| 2004/0077973 | A1 | 4/2004 | Groenke et al. | |
| 2005/0171504 | A1* | 8/2005 | Miller | A61B 17/1671 604/506 |
| 2005/0261693 | A1* | 11/2005 | Miller | A61B 17/3472 606/80 |
| 2009/0112119 | A1* | 4/2009 | Kim | A61B 34/35 600/564 |
| 2009/0131827 | A1* | 5/2009 | Crocker | A61B 10/025 604/22 |
| 2014/0262408 | A1* | 9/2014 | Woodard | A61B 17/1637 173/217 |
| 2017/0119359 | A1* | 5/2017 | Islam | A61B 10/0266 |
| 2017/0311981 | A1* | 11/2017 | Real | A61B 17/3421 |
| 2017/0340401 | A1* | 11/2017 | Miller | A61B 50/30 |
| 2018/0228509 | A1* | 8/2018 | Fojtik | A61B 17/3472 |

\* cited by examiner

MEDICAL NEEDLE DEVICE

CROSS REFERENCE TO RELATED APPLICATIONS

This application is a National Stage of International Application No. PCT/KR2020/015387, filed Nov. 5, 2020, claiming priority to Korean Patent Application No. 10-2019-0179618, filed Dec. 31, 2019, the entire disclosures of which are incorporated herein by reference.

TECHNICAL FIELD

The present invention relates to a medical needle device, and more specifically, to a medical needle device capable of drilling a fine passage in an affected part of a patient, or collecting a portion of tissue in the body of the patient.

BACKGROUND ART

In general, various types of surgical tools are used to inject a specific substance into a human body or to obtain a tissue of a specific part of the human body. In general, these surgical tools should allow easy access to the inside of the human body and ensure the operator's convenience and the patient's safety during the operation.

These surgical tools come in various shapes and types depending on purpose or surgical site. For example, for tissues such as bones which are dense and hard or areas such as the spine which require high precision due to the concentration of nerves, special surgical tools suitable therefor should be used.

In addition, while inserting the needle, in order to confirm whether the needle is inserted in the correct position, X-rays are taken multiple times during the operation. While taking X-rays and reading the same, not a few parts are obstructed by the handle of the needle, thereby making it difficult to take X-rays accurately. Therefore, it is difficult to make correct confirmation and determination through the X-ray images, and thus it is quite difficult to insert the needle accurately. Accordingly, there is a demand for a technique which may solve such inconvenience.

PATENT ART LITERATURE

Patent Literature (Patent literature 1) KR 2009-0110983
(Patent literature 2) U.S. Pat. No. 6,613,054

DETAILED DESCRIPTION OF INVENTION

Technical Task

It is an object of the present invention, which was devised to solve the above problem, to provide a medical needle device capable of drilling a fine passage in an affected part of a patient, or collecting a portion of tissue in the body of the patient.

Means for Solving Technical Task

The present invention which aims to solving the above problem relates to a medical needle device, comprising: a handle part having a handle and a locking knob rotatably fixed to the handle; and a needle assembly having at least a part inserted into an insertion hole of the locking knob, wherein the cross-sectional shape of the insertion hole and the cross-sectional shape of the lowermost end of the inserted part of the needle assembly cross each other by the rotation of the locking knob, so that the part of the needle assembly is fixed in the insertion hole.

In addition, the needle assembly comprises: a hollow exterior; an exterior fixing part fixed to one end of the exterior; a needle inserted into the exterior; and a needle fixing part fixed to one end of the needle and detachable to the exterior fixing part, and wherein at least a portion of the exterior fixing part is inserted into the locking knob through the insertion hole in a state having the needle fixing part mounted.

In addition, it is characterized in that a fastening screw is formed at an opposite end of the exterior of the exterior fixing part.

In addition, it is characterized in that an exposed holding part exposed to the outside of the insertion hole is formed at a lower end of the exterior fixing part.

In addition, it is characterized in that a striking seat capable of striking is formed at an upper end of the handle.

In addition, it is characterized in that a marking part capable of confirming the direction of the needle is formed at the striking seat.

In addition, it is characterized in that a handle receiving part in communication with the inside of the locking knob having a part of the exterior fixing part seated in a state having the needle fixing part mounted is formed inside the handle.

In addition, it is characterized in that a limited seat part to which a movement limiting part formed in the locking knob is connected is formed in a first coupling part coupled to the locking knob of the handle, so as to limit the angular range of the relative movement of the handle and the locking knob.

In addition, it is characterized in that the movement limiting part is one or more locking protrusions protruding from the locking knob, and the limited seat part is a movement limiting groove concavely formed at a predetermined angle.

In addition, it is characterized in that a biasing part is formed at the locking knob, so as to bias the exterior fixing part upward.

In addition, it is characterized in that the biasing part is a tapered part formed around the insertion hole of the locking knob, and when the locking knob is rotated, a lower surface of the exterior fixing part is pushed upward.

In addition, it is characterized in that a first fixation maintaining part is formed at a lower surface of the exterior fixing part, and a second fixation maintaining part corresponding to the first fixation maintaining part is formed on the locking knob, and when the locking knob is rotated, the first fixation maintaining part and the second fixation maintaining part are coupled to each other so that the needle assembly maintains a fixation state with respect to the handle.

Effect of Invention

Through the present invention, a needle and a handle of the medical needle device may be separated, and thus the device may be conveniently used while not obstructing the view of the affected part when using the same.

Further, through the present invention, the handle and the needle are unshakably fastened, and thus may be stably used.

BEST MODE FOR CARRYING OUT THE INVENTION

Figure 1A:
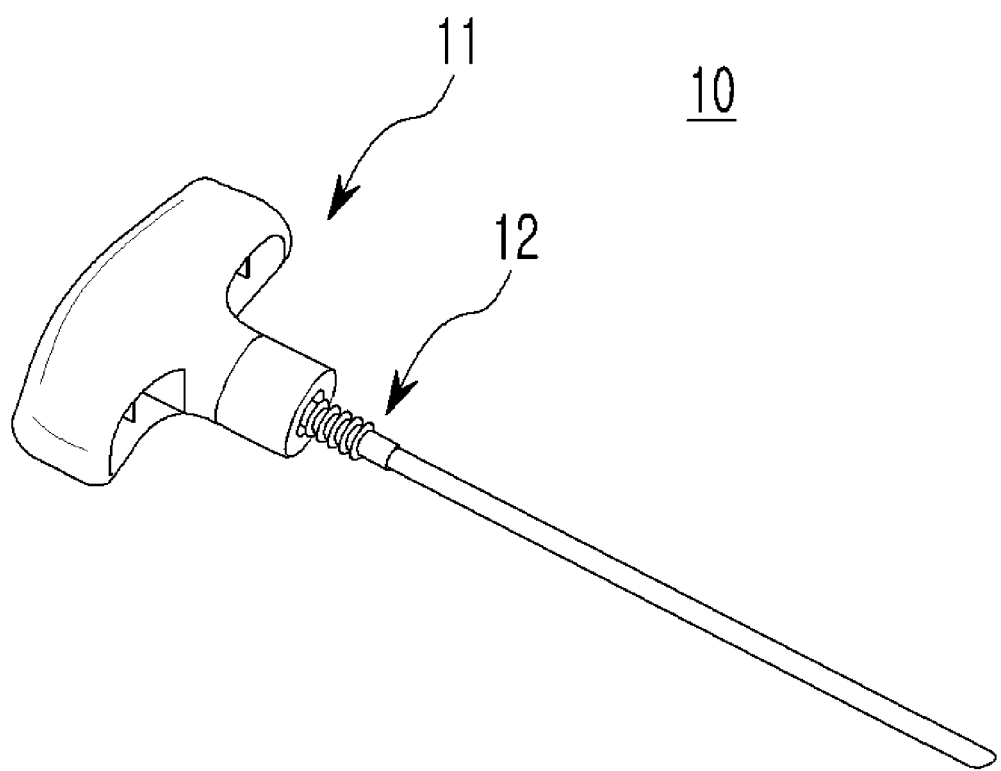
FIG. 1a is a perspective view of the medical needle device according to an embodiment of the present invention.

Hereinafter, preferred embodiments of the present invention will be explained with reference to the accompanying drawings. In adding reference numerals to the components of the following drawings, the same components are given the same reference numerals as much as possible even if they are displayed on different drawings, and detailed description of known functions and configurations which are determined to unnecessarily obscure the gist of the present invention are omitted.

Figure 1B:
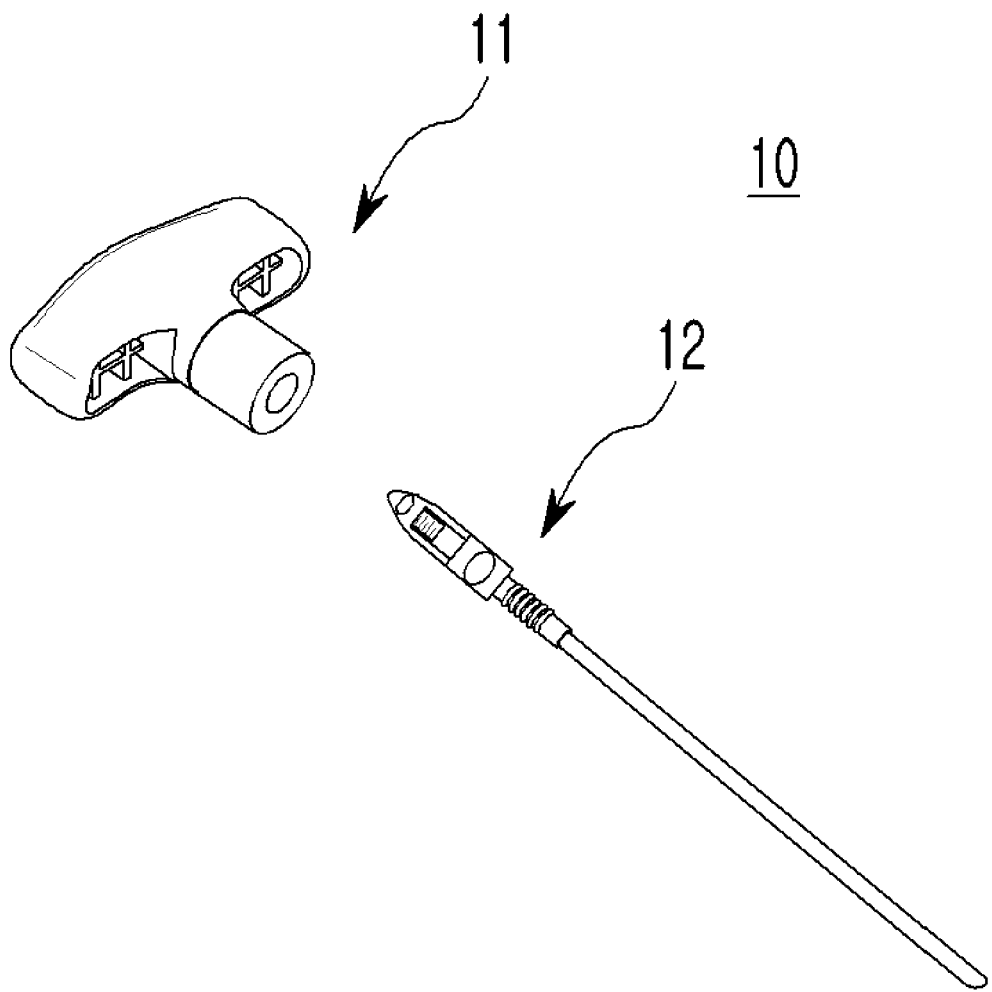
FIG. 1b is an exploded perspective view in which the handle part and the needle assembly of the medical needle device according to an embodiment of the present invention are disassembled.
Figure 2:
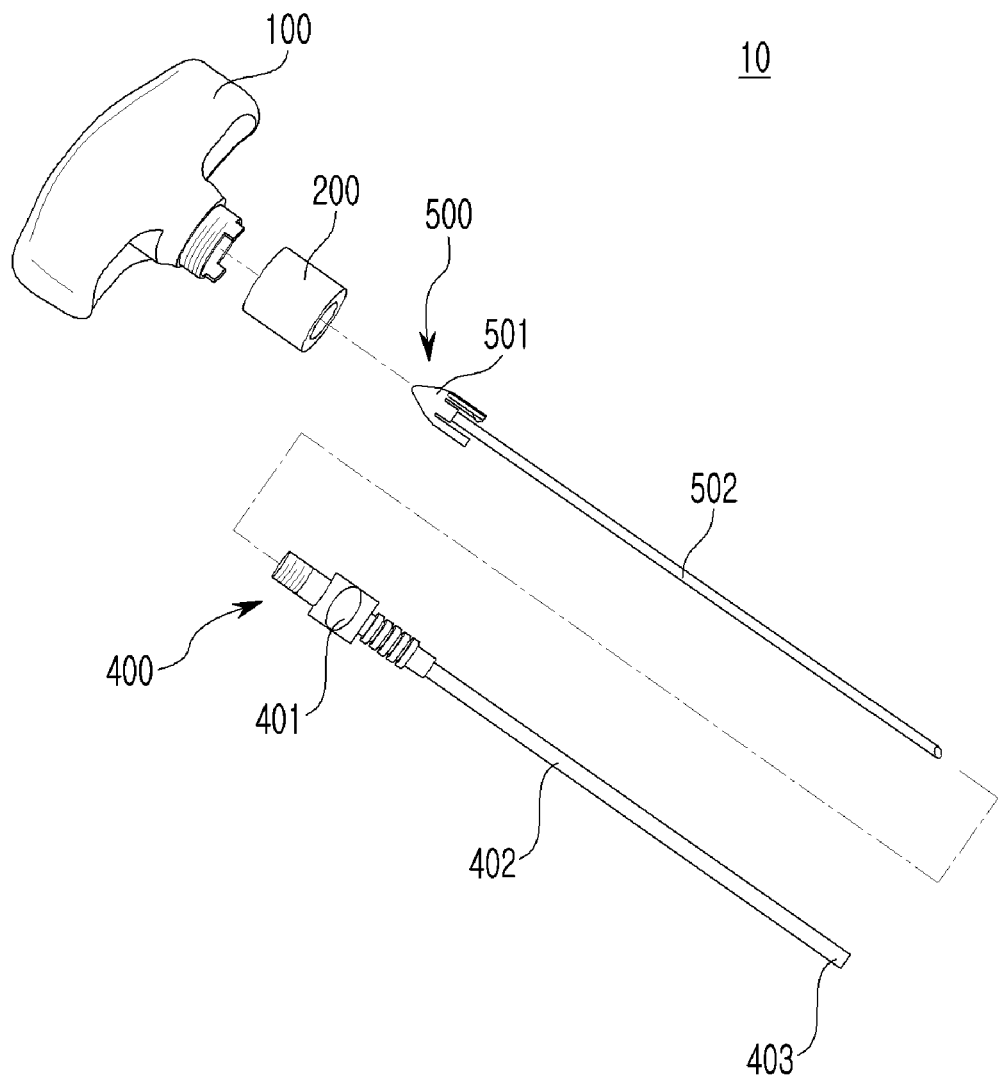
FIG. 2 is an overall exploded perspective view of the medical needle device according to an embodiment of the present invention.

The medical needle device 10 according to the present invention will be explained with reference to FIGS. 1a to 2. As illustrated in FIGS. 1a to 2, the medical needle device 10 is largely divided and comprises a handle part 11 and a needle assembly 12. The handle part 11 comprises a handle 100 and a locking knob 200 rotatably fixed to the handle 100, and at least a portion of the needle assembly 12 is inserted into the insertion hole 250 of the locking knob 200.

The needle assembly 12 comprises a needle part 500 and an exterior part 400 into which the needle part 500 is inserted. The needle part 500 comprises a needle fixing part 501 and a needle 502, and the exterior part 400 comprises an exterior fixing part 401 and an exterior 402.

In the present specification, the upper direction refers to a direction toward the handle 100, and the lower direction refers to a direction opposite to the upper direction.

Figure 3:
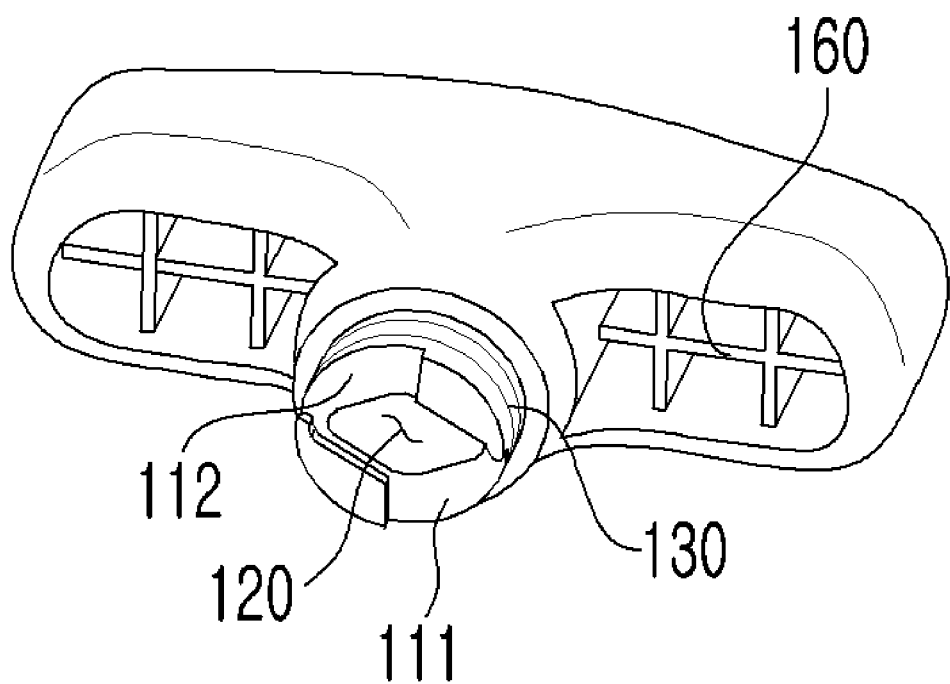
FIG. 3 is a bottom perspective view of the handle of the medical needle device in accordance with an embodiment of the present invention.
Figure 4:
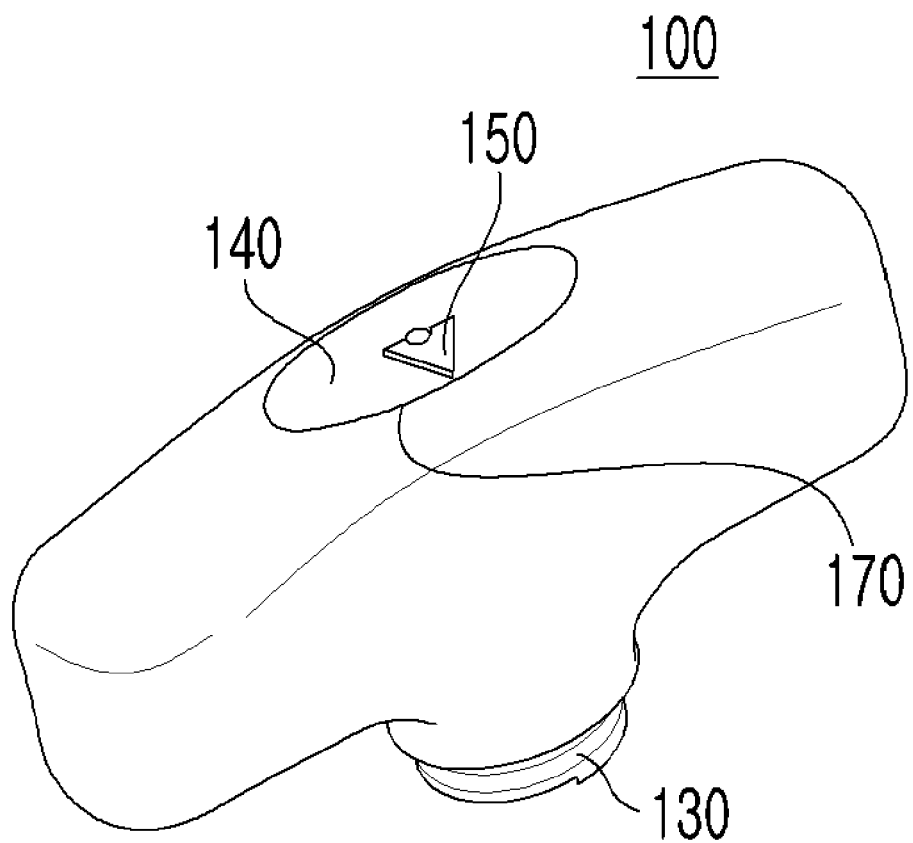
FIG. 4 is a top perspective view of the handle of the medical needle device in accordance with an embodiment of the present invention.
Figure 5:
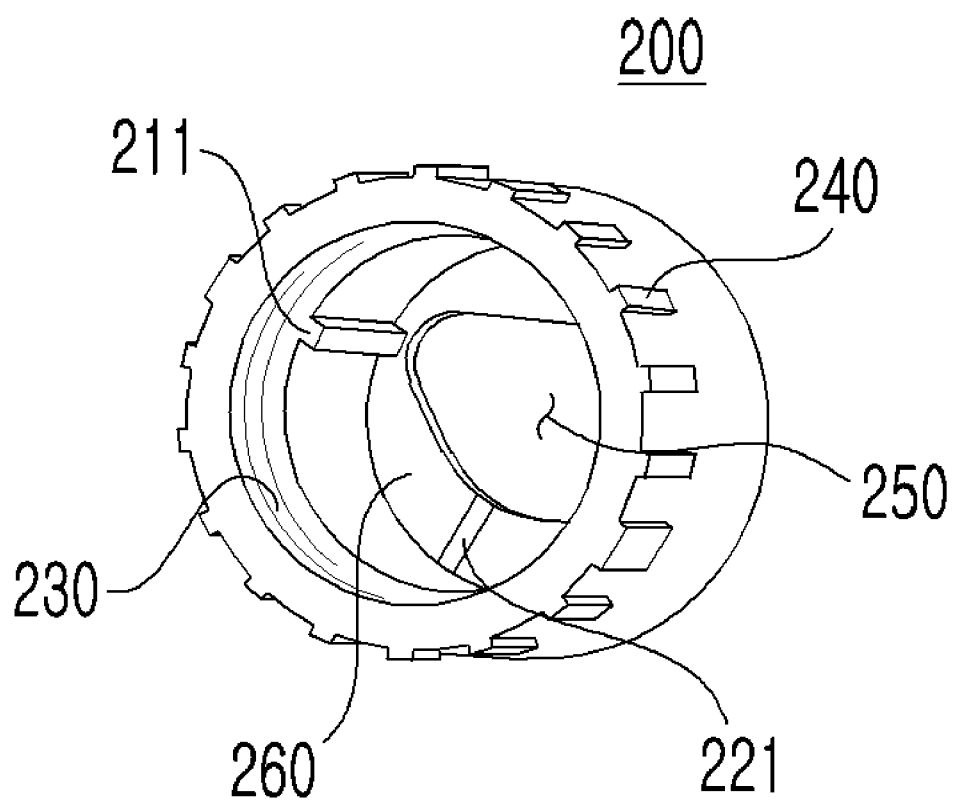
FIG. 5 is a perspective view illustrating the inside of the locking knob of the medical needle device according to an embodiment of the present invention.
Figure 6:
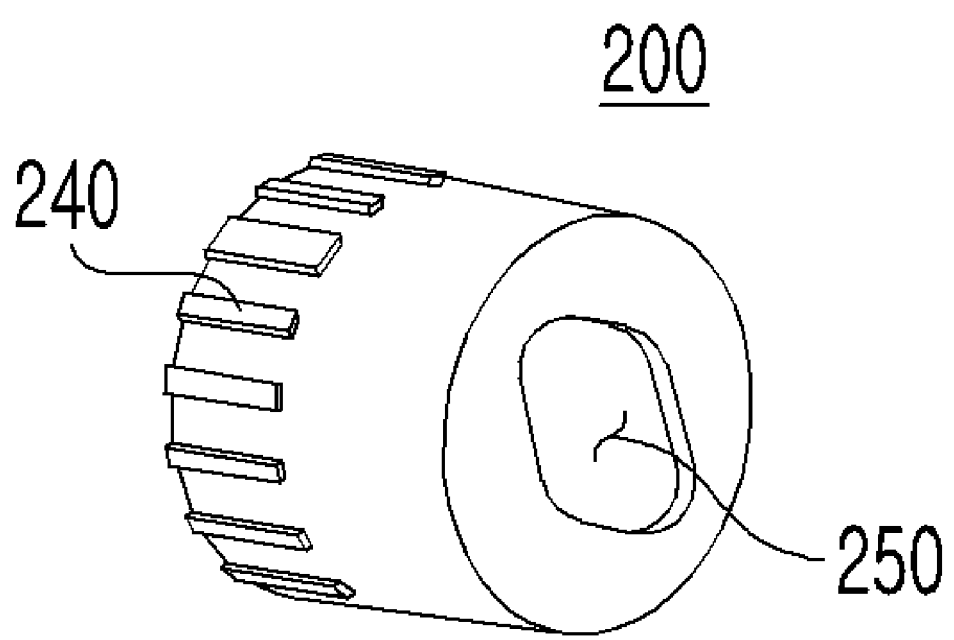
FIG. 6 is a perspective view illustrating the outside of the locking knob of the medical needle device according to an embodiment of the present invention.
Figure 7:
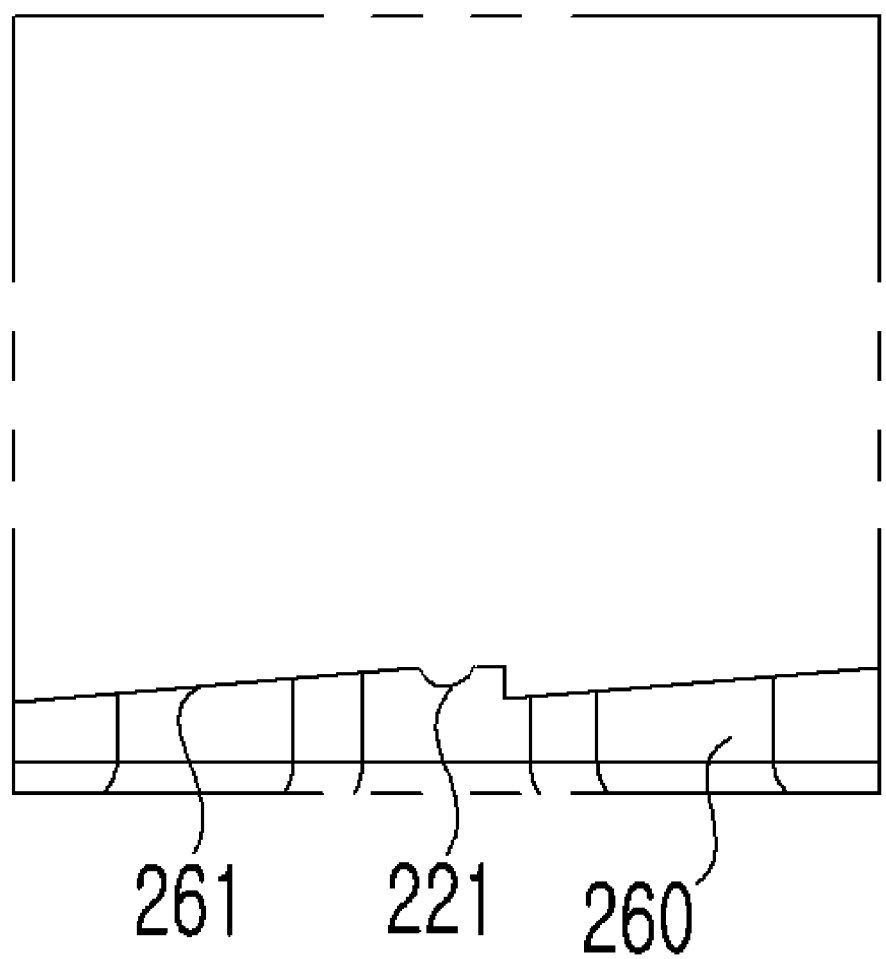
FIG. 7 is part of a planar view illustrating a part of the locking knob of the medical needle device according to an embodiment of the present invention.
Figure 8:
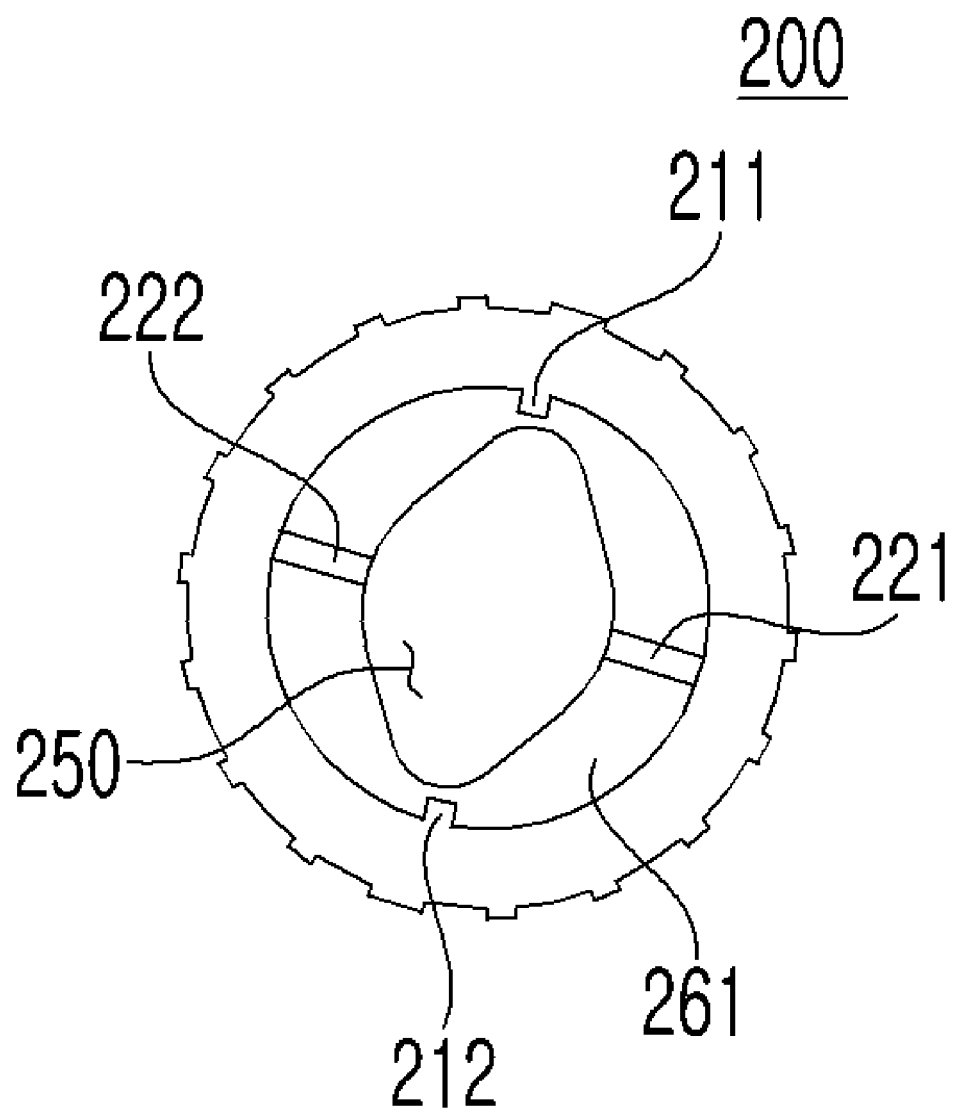
FIG. 8 is a plan view of the locking knob of the medical needle device according to an embodiment of the present invention.
Figure 9:
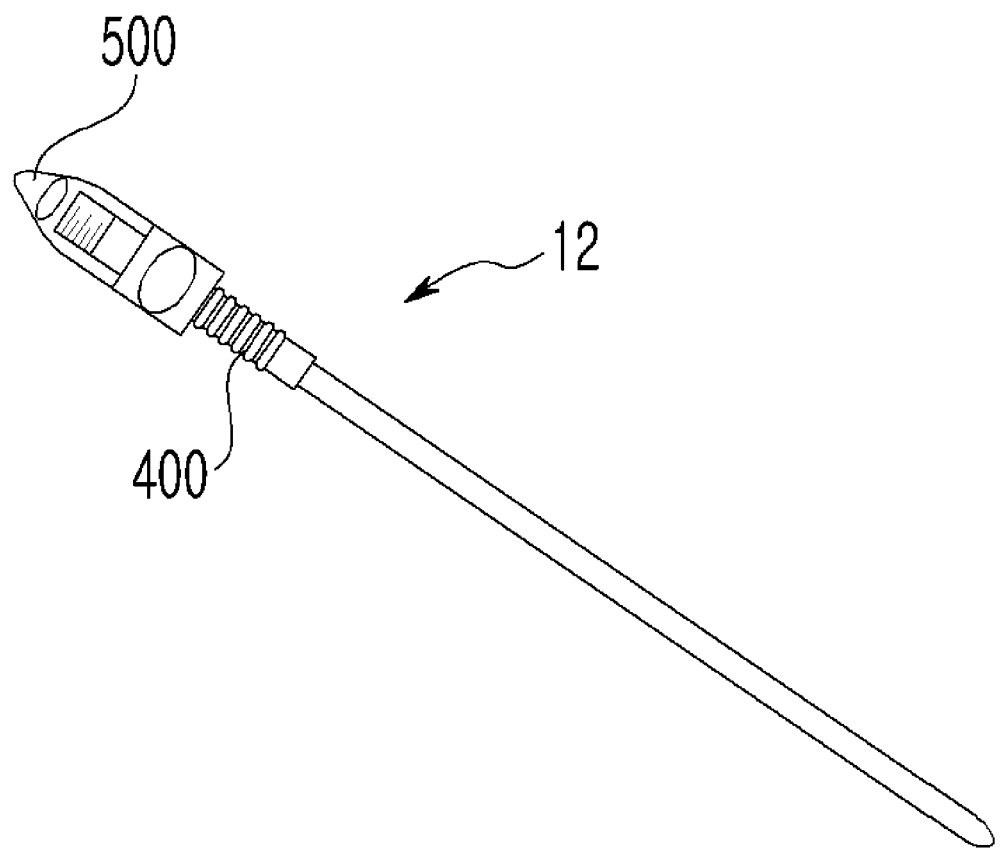
FIG. 9 is an overall perspective view of the needle assembly of the medical needle device according to an embodiment of the present invention.

Next, the handle part 11 of the medical needle device 10 according to the present invention will be explained with reference to FIGS. 3 and 4. As illustrated in FIGS. 3 and 4, the handle 100 is formed in a T-shape for user's convenience. In addition, the inside of the handle 100 is formed in a lattice structure frame 160, allowing sufficient structural stability while reducing weight. Further, the cooling time may be shortened while manufacturing the product, and thus the manufacturing time may be shortened.

In addition, the handle 100 comprises a striking seat 140 made in a plane on a head part 170 located at an uppermost side in the upward direction, and the striking seat 140 has a center normal line formed to coincide with the axis of the needle 502.

In addition, the handle 100 comprises a first coupling part 130 which may be coupled to the locking knob 200, and the first coupling part 130 is located in a direction opposite to the striking seat 140.

The first coupling part 130 may be at least one or more annular protrusions, but is not necessarily limited thereto and may be formed in other shapes.

Next, the locking knob 200 of the medical needle device 10 according to the present invention will be explained with reference to FIGS. 5 to 8. As illustrated in FIGS. 5 to 8, the locking knob 200 has an open upper part and a closed lower part, and an insertion part 250 is penetratingly formed in the closed lower part. The locking knob 200 is coupled to the first coupling part 130 formed on the handle 100.

In addition, a second coupling part 230 for coupling with the first coupling part 130 of the handle 100 is formed at one end of the locking knob 200. The second coupling part 230 may be formed inside the locking knob 200. The second coupling part 230 may have an annular groove formed so as to be engaged with the first coupling part 130 having an annular protrusion. However, the shape of the second coupling part 230 is not necessarily limited thereto, and an annular groove may be formed in the first coupling part 130 and an annular protrusion may be formed in the second coupling part 230. In addition, the first coupling part 130 and the second coupling part 230 may be coupled to each other using other shapes having the same function.

A non-slip part 240 is formed on a portion of the outer surface of the locking knob 200 to prevent slipping when the user operates the locking knob 200. In addition, an insertion hole 250 into which the needle assembly 12 is inserted is formed in a lower part of the locking knob 200, and the insertion hole 250 may be formed in the form of an ellipse having a large slenderness ratio, an oval or a polygon.

Next, the needle assembly 12 of the medical needle device 10 according to the present invention will be explained with reference to FIGS. 9 to 13. As illustrated in FIGS. 9 to 12, the needle assembly 12 comprises a needle part 500 and an exterior part 400 into which the needle part 500 is inserted.

The needle part 500 comprises a needle 502 and a needle fixing part 501, and the exterior part 400 comprises an exterior 402 and an exterior fixing part 401. The needle part 500 is formed to be detachable from the exterior part 400, and at least a portion of the exterior part 400 is inserted into the locking knob 200 through the insertion hole 250 of the locking knob 200 in a state having the needle part 500 mounted.

Figure 10:
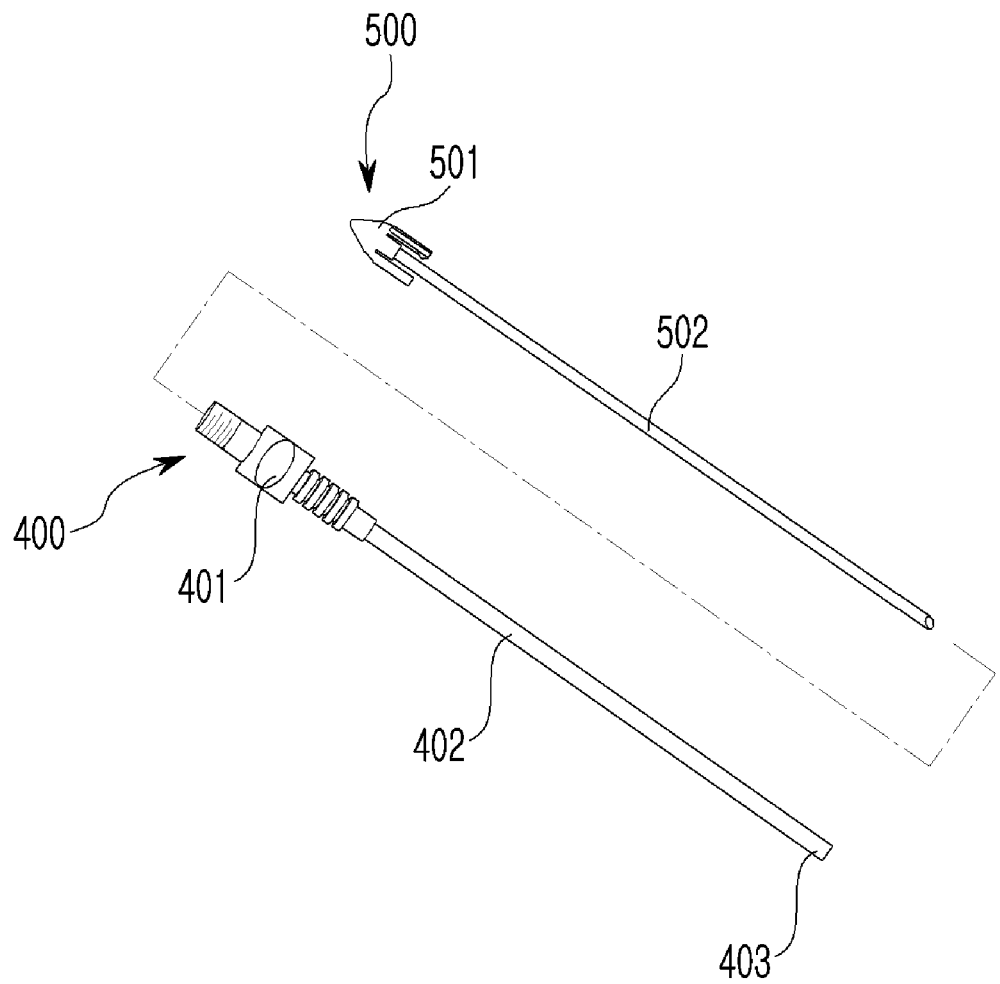
FIG. 10 is an exploded perspective view of the needle assembly of the medical needle device according to an embodiment of the present invention.
Figure 11:
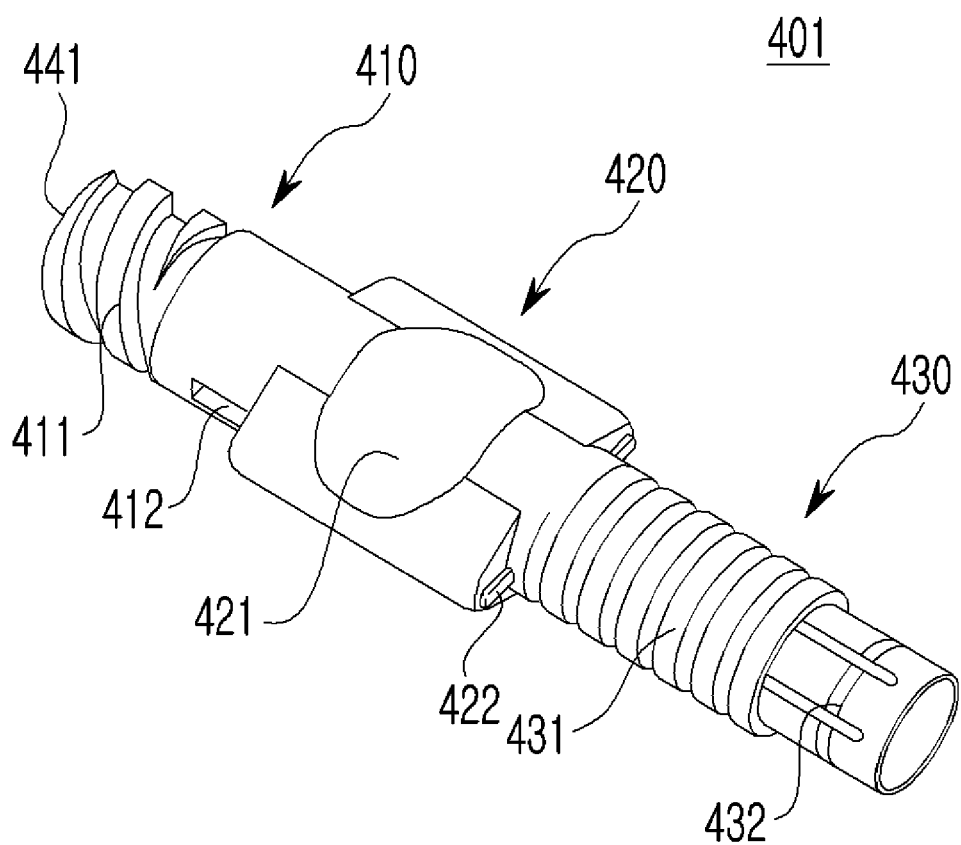
FIG. 11 is a perspective view of the exterior fixing part of the needle assembly according to an embodiment of the present invention.

As illustrated in FIGS. 10 and 11, the exterior fixing part 401 comprises a first fastening part 410, a body part 420, and an exposed holding part 430. The first fastening part 410 may comprise a fastening groove 412, and a fastening screw 411 may be further formed outside or inside the first fastening part 410. In addition, the needle part 500 and the exterior part 400 may be coupled to each other through the first fastening groove 412. In addition, an internal hole 441 may be formed on the exterior fixing part 401 in the longitudinal direction of the exterior fixing part 401, and a portion of the exterior 402 is inserted into a portion of the internal hole 441. Accordingly, the internal hole 441 may be in communication with the exterior 402.

The first fastening part 410 is located at an end opposite to the exterior 402 of the exterior fixing part 401.

The fastening screw 411 may be formed to couple a separate device (not shown) for injecting a drug through the exterior 402.

The body part 420 is located between the first fastening part 410 and the exposed holding part 430, and when the needle assembly 12 is separated from the handle part 11, the body part 420 serves as a handle allowing the user to hold the needle assembly 12. A first holding groove 421 is formed so that the user may easily hold the body part 420.

The exposed holding part 430 is located at a lower end of the exterior fixing part 401, and comprises a first holding part 431 and a tube connector 432. The exposed holding part 430 is exposed to the outside of the insertion hole 250 of the locking knob 200. Accordingly, the exposed holding part 430 is exposed to the outside of the handle part 11 when the needle assembly 12 is coupled to the handle part 11 so as to be used as a handle by the user.

A tube connector 432 is formed at a lower part of the exposed holding part 430 to fasten a safety tube (not shown) for protecting the exterior 402 and the needle 502. The tube connector 432 is formed to guide the insertion of the safety tube (not shown), and a plurality of protrusions may be formed in the longitudinal direction of the exterior fixing part 401.

Figure 12:
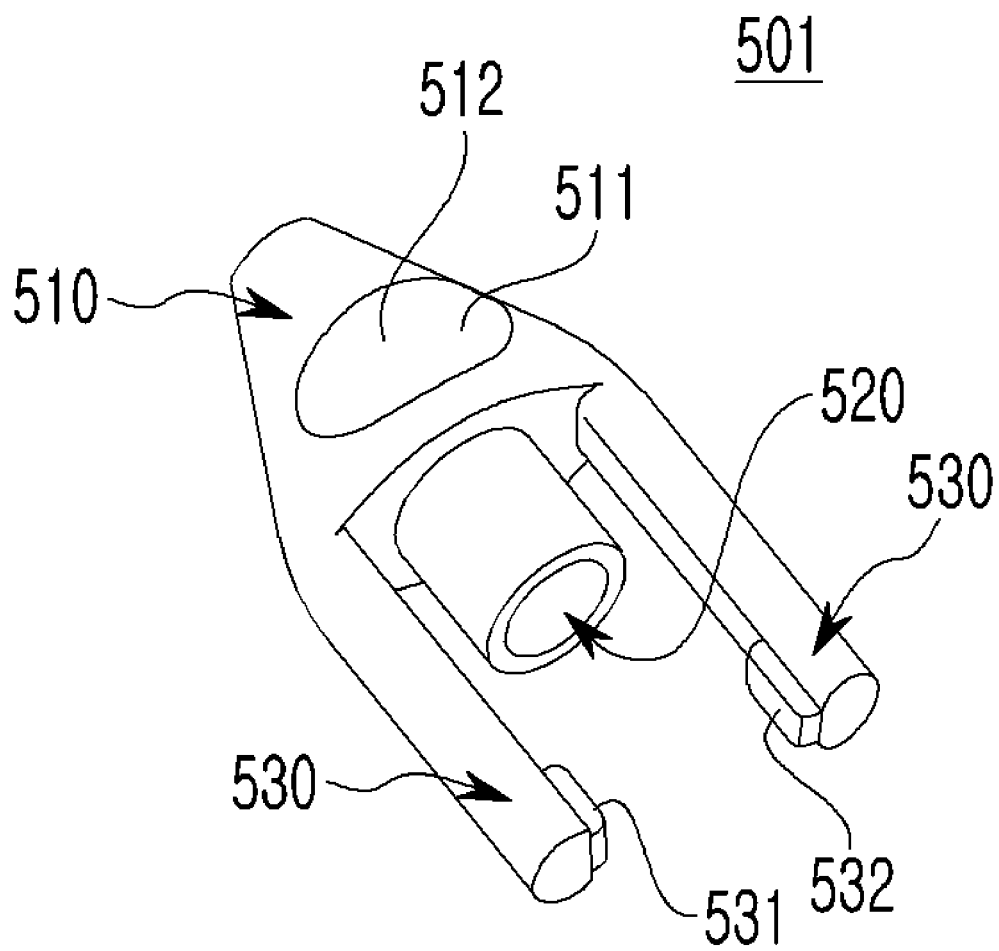
FIG. 12 is a perspective view of the needle fixing part of the needle assembly according to an embodiment of the present invention.

As illustrated in FIG. 12, the needle fixing part 501 comprises a holding part 510, an insertion part 520, and a second fastening part 530. The holding part 510 may be formed in a cone shape so that the needle assembly 12 may be easily inserted into the handle part 11 when the needle assembly 12 is inserted into the handle part 11. In addition, the holding part 510 comprises a second holding groove 511 so that the user may easily hold it. The insertion part 520 is located at a lower side of the holding part 510 and is inserted into the internal hole 441 of the first fastening part 410 of the exterior fixing part 401. The second fastening part 530 is formed in the longitudinal direction of at least two or more needle fixing parts 501 at a lower end of the holding part 510, and protrusions 531 and 532 are formed inside an end of the second fastening part 530. The protrusions 531 and 532 are coupled to the first fastening groove 412 of the first fastening part 410. In this case, the ends of the protrusions 531 and 532 have a round shape so that the protrusions 531 and 532 may be easily coupled to the first fastening groove 412.

The first fastening part 410 of the exterior fixing part 401 is inserted into the insertion part 520, and the needle part 500 and the exterior part 400 are fastened to each other while the internal protrusion 531 at a distal end of the second fastening part 530 is fastened to the first fastening groove 412.

The exterior 402 is connected to the exterior fixing part 401, and comprises a tapered part 403 at a distal end, so that the needle 502 may be inserted more easily when inserted into the tissue. In addition, the user may confirm how much the needle 502 is inserted by further comprising a marking part (not shown) on the exterior 402.

The needle 502 is connected to the needle fixing part 501, and the distal end is formed to be sharp to be inserted into the tissue. The shape of the distal end of the needle 502 may be a troca, beveled, and diamond shape, but the shape of the needle 502 is not particularly limited thereto as far as it is a shape that allows the needle to be inserted into human tissue, and may be modified.

When the needle 502 has a beveled shape, which is an oblique shape, in order to indicate which direction the sharp part of the needle 502 is facing, the striking seat 140 of the handle 100 may further comprise a first marking part 150 which indicates the direction of the needle 502. By locating the first marking part 150 on the striking seat 140, it is possible to improve visibility when the user strikes the handle 100, and indicate which direction the sharp part of the beveled needle 502 faces.

In addition, a second marking part 512 for allowing the user to recognize the direction of the needle 502 is also formed on one surface of the second holding groove 511. When the needle 502 has a beveled shape, in case the needle assembly 12 and the handle part 11 are separated, the second marking part 512 allows the user to recognize the direction which the sharp part of the needle 502 is facing.

When the needle 502 has a beveled shape, in case the handle part 11 and the needle assembly 12 are provided in a coupled state, the first marking part 150 and the second marking part 512 should be coupled to face the same direction.

At least one or more limited seat part is formed at one end of the first coupling part 130 of the handle 100. The limited seat part is a movement limiting groove 111, 112 concavely formed at a predetermined angle. The remaining part other than the limited seat part formed as movement limiting grooves 111 and 112 may be protrudingly formed in the first coupling part 130. However, the shape of the limited seat part is not necessarily limited thereto, and may be any protruding shape which is not a groove, and may be formed in a different shape as far as it can perform the same function.

In addition, a handle receiving part 120 in communication with the inside of the locking knob 200 having a part of the exterior fixing part 401 seated in a state having the needle fixing part 501 mounted is formed inside the handle 100. The inner upper side of the handle receiving part 120 may be in a cone shape corresponding to the shape of the holding part 510 to facilitate insertion of the holding part 510.

In addition, the locking knob 200 may have at least one or more movement limiting parts formed therein, and the movement limiting part may be one or more locking protrusions 211 and 212 protruding from the inside of the locking knob 200.

The movement limiting part formed on the locking knob 200 operates in correspondence with the limited seat part formed on the first coupling part 130 of the handle 100, and when the locking knob 200 is rotated, an angular range of the relative movement of the handle 100 and the locking knob 200 is limited due to the movement limiting part and the limited seat part. The locking knob 200 may have an angular range of relative movement in the range of 0° to 90°.

In addition, the locking knob 200 has one or more second fixation maintaining parts 221 formed on the bottom part 260, and the second fixation maintaining parts 221 correspond to the first fixation maintaining parts 422 formed at a lower surface of the exterior fixing part 401. When the locking knob 200 is rotated, the first fixation maintaining part 422 and the second fixation maintaining part 221 are coupled to each other, so that the needle assembly 12 can maintain a fixation state with respect to the handle 100.

The shape of the insertion hole 250 of the locking knob 200 is the same as that of the cross section of the body part 420 of the exterior fixing part 401, but the insertion hole 250 of the locking knob is larger than the cross section of the body part 420 of the exterior fixing part 420. Accordingly, the body part 420 of the exterior fixing part enters the inside of the insertion hole 250 of the locking knob, and only the exposed holding part 430 at a lower end of the exterior fixing part 401 is exposed to the outside of the locking knob 200. When the locking knob 200 is rotated, the cross-sectional shape of the insertion hole 250 and the cross-sectional shape of the body part 420 of the exterior fixing part cross each other, so that the body part 420 is restrained inside the locking knob 200 while a lower surface of the body part 420 is supported by the bottom part 260 in the insertion hole 250 of the locking knob 200. When the first fixation maintaining part 422 of the exterior fixing part 401 and the second fixation maintaining part 221 of the locking knob 200 are engaged with each other, the needle assembly 12 maintains a locking state with respect to the handle part 11.

In addition, the bottom part 260 of the locking knob 200 comprises a biasing part 261 to prevent shaking by biasing the exterior fixing part 401 upward. The biasing part 261 is a tapered part formed around the insertion hole 250 of the locking knob 200, and the biasing part 261 is formed to rise upwardly. The second fixation maintaining part 221 is located at a distal end of the biasing part 261. Thus, when the locking knob 200 is rotated, a lower surface of the exterior fixing part 401 is pushed upward, and finally the first fixation maintaining part 422 of the exterior fixing part 410 and the second fixation maintaining part 221 of the locking knob 200 are engaged with each other. As a result, the needle assembly can unshakably maintain a locking state with respect to the handle part.

Next, a method of using the medical needle device according to the present invention will be explained with reference to FIG. 13. First, as illustrated in (a) of FIG. 13, the medical needle device 10 in which the needle assembly 12 is fastened to the handle 100 in a fixed state is inserted into the tissue 2. At this time, the striking seat 140 formed at an upper end of the handle 100 is stroken by a mallet 1 to be inserted.

Figure 13:
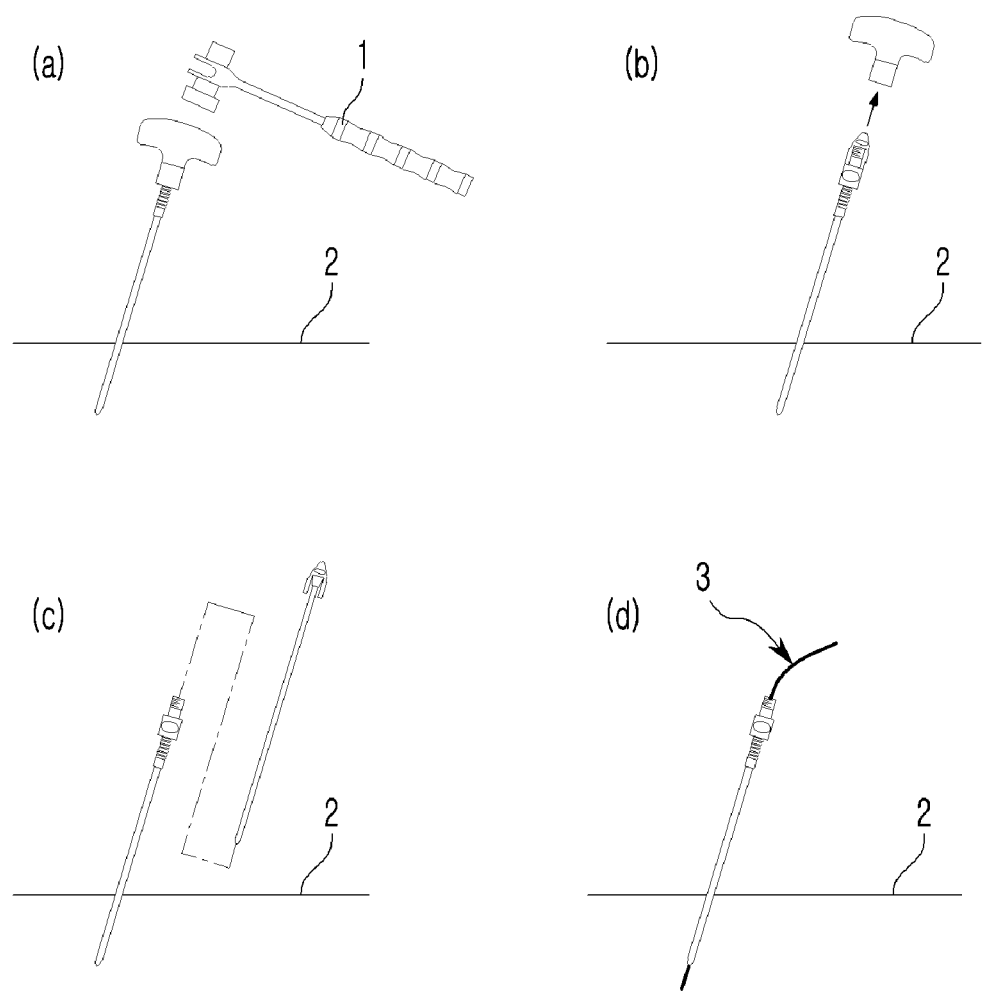
FIG. 13 is a schematic view illustrating a method of using the medical needle device according to an embodiment of the present invention.

When the insertion is completed, as illustrated in (b) and (c) of FIG. 13, after separating the handle 100 from the needle assembly 12 by rotating the locking knob 200 while holding the handle part 11, the needle part 500 is separated from the exterior part 400. After the needle part 500 is separated from the exterior part, the guide wire 3 is inserted into the exterior 402 as illustrated in (d) of FIG. 13, and after the guide wire 3 is inserted into the tissue 2, the exterior part 400 is removed from the tissue.

As another method of use, as shown in (c) in FIG. 13, after separating the needle part 500 from the exterior part 400, a desired tissued may be collected by injecting a drug through the exterior part 400 or inserting a collecting device (not shown) capable of collecting a tissue 2 through the exterior part 400 instead of the needle 502.

In addition, when the exterior part 400 is separated from the tissue 2, if the separation is not easy, the handle part 11 may be first coupled to the exterior part 400 and then separated.

As described above, the present invention has been explained with reference to preferred embodiments of the present invention, but it may be understood that those skilled in the art can variously modify and change the present invention within the scope without departing from the spirit and scope of the present invention as described in the claims below.

INDUSTRIAL APPLICABILITY

Through the present invention, the needle may be unshakably fixed to the handle, allowing the operation to be performed more stably, and reducing the effort of the doctor. In addition, thanks to the advantage of being able to easily control the locking and unlocking of the device with a simple manipulation, it is expected to be widely used in the relevant field.

DESCRIPTION REFERENCE NUMERALS

10: medical needle device
11: handle part
12: needle assembly
100: handle
111, 112: movement limiting groove
120: handle receiving part
130: first coupling part
140: striking seat
150: first marking part
160: frame
170: head part
200: locking knob
211, 212: locking protrusion
221, 222: second fixation maintaining part
230: second coupling part
240: non-slip part
250: insertion hole
260: bottom part
261: biasing part
400: exterior part
401: exterior fixing part
402: exterior
403: tapered part
410: first fastening part
411: fastening screw
412: first fastening groove
420: body part
421: first holding groove
422: first fixation maintaining part
430: exposed holding part
431: first holding part
432: tube connector
441: internal hole
501: needle fixing part
510: second holding part
511: second holding groove
512: second marking part
520: insertion part
530: second fastening part
531, 532: second protrusion
1: mallet
2: tissue
3: guide wire

What is claimed is:
1. A medical needle device, comprising:
a handle part having a handle and a locking knob rotatably fixed to the handle; and
a needle assembly having at least a part inserted into an insertion hole of the locking knob,
wherein a cross-sectional shape of the insertion hole and a cross-sectional shape of a lowermost end of the inserted part of the needle assembly cross each other by the rotation of the locking knob, so that the inserted part of the needle assembly is fixed in the insertion hole.

2. The medical needle device of claim 1, wherein the needle assembly comprises:
an exterior which is hollow;
an exterior fixing part fixed to one end of the exterior;
a needle inserted into the exterior; and
a needle fixing part fixed to one end of the needle and detachable to the exterior fixing part, and
wherein at least a portion of the exterior fixing part is inserted into the locking knob through the insertion hole in a state having the needle fixing part mounted.

3. The medical needle device of claim 2, wherein a fastening screw is formed at an opposite end of the exterior of the exterior fixing part.

4. The medical needle device of claim 2, wherein an exposed holding part exposed to an outside of the insertion hole is formed at a lower end of the exterior fixing part.

5. The medical needle device of claim 1, wherein a striking seat capable of striking is formed at an upper end of the handle.

6. The medical needle device of claim 5, wherein a marking part capable of confirming a direction of the needle assembly is formed at the striking seat.

7. The medical needle device of claim 1, wherein a handle receiving part in communication with an inside of the locking knob having a part of the exterior fixing part seated in a state having the needle fixing part mounted is formed inside the handle.

8. The medical needle device of claim 1, wherein a limited seat part is formed in a first coupling part coupled to the locking knob of the handle, the limited seat part being configured to be connected to a movement limiting part formed on the locking knob so as to limit an angular range of relative movement of the handle and the locking knob.

9. The medical needle device of claim 8, wherein the movement limiting part is one or more locking protrusions protruding from the locking knob, and the limited seat part is a movement limiting groove concavely formed at a predetermined angle.

10. The medical needle device of claim 2, wherein a biasing part is formed at the locking knob, so as to bias the exterior fixing part upward.

11. The medical needle device of claim 10, wherein the biasing part is a tapered part formed around the insertion hole of the locking knob, and when the locking knob is rotated, a lower surface of the exterior fixing part is pushed upward.

12. The medical needle device of claim 2, wherein a first fixation maintaining part is formed at a lower surface of the exterior fixing part, and a second fixation maintaining part corresponding to the first fixation maintaining part is formed on the locking knob, and when the locking knob is rotated, the first fixation maintaining part and the second fixation maintaining part are coupled to each other so that the needle assembly maintains a fixation state with respect to the handle.

13. The medical needle device of claim 10, wherein a first fixation maintaining part is formed at a lower surface of the exterior fixing part, and a second fixation maintaining part corresponding to the first fixation maintaining part is formed on the locking knob, and when the locking knob is rotated, the first fixation maintaining part and the second fixation maintaining part are coupled to each other so that the needle assembly maintains a fixation state with respect to the handle.

* * * * *